(12) United States Patent
Tateoka et al.

(10) Patent No.: US 10,324,450 B2
(45) Date of Patent: Jun. 18, 2019

(54) EMERGENCY STOP SYSTEM ATTACHED TO MOBILE DEVICE

(71) Applicant: FANUC CORPORATION, Yamanashi (JP)

(72) Inventors: Yuuya Tateoka, Yamanashi (JP); Syuntarou Toda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/789,385

(22) Filed: Oct. 20, 2017

(65) Prior Publication Data
US 2018/0113435 A1    Apr. 26, 2018

(30) Foreign Application Priority Data

Oct. 24, 2016  (JP) .................................. 2016-207850

(51) Int. Cl.
*G06K 9/00*       (2006.01)
*G05B 19/406*   (2006.01)
(Continued)

(52) U.S. Cl.
CPC .......... *G05B 19/406* (2013.01); *B25J 9/1674* (2013.01); *G06F 3/0488* (2013.01);
(Continued)

(58) Field of Classification Search
CPC .. G06K 9/00771; G06K 9/4652; G06K 9/209; G06F 3/0488; G05B 19/406; G05B 2219/501989; B25J 9/1674
See application file for complete search history.

(56) References Cited

U.S. PATENT DOCUMENTS 7,208,899 B2    4/2007   Hashimoto et al.
9,061,418 B2    6/2015   Toda
(Continued)

FOREIGN PATENT DOCUMENTS

CN    1838002 A      9/2006
CN    101107102 A    1/2008
(Continued)

OTHER PUBLICATIONS

"Physical button (i.e., iKey) installed at the earphone jack of Android smartphone is terribly convenient", Gigazine, Jul. 19, 2014, https://gigazine.net/news/20140719-ikey/, 10 pages.
(Continued)

*Primary Examiner* — Amir Alavi
(74) *Attorney, Agent, or Firm* — RatnerPrestia

(57) ABSTRACT

An emergency stop system includes: an emergency stop switch including an operation button, a state output unit which outputs a state different in accordance with whether or not the operation button is pushed down, and an attachment unit which attaches the operation button and the state output unit to the mobile device in a detachable manner in such a manner that the state of the state output unit is positioned at a side facing a camera of the mobile device at the time of attachment to the mobile device; and an information processing unit determines in accordance with an image related to the state of the state output unit as imaged by the camera whether to output an emergency stop signal indicating an emergency stop of the machine operated by the mobile device or to output an emergency stop signal indicating no emergency stop of the machine.

11 Claims, 16 Drawing Sheets

(51) Int. Cl.
*B25J 9/16* (2006.01)
*G06F 3/0488* (2013.01)
*G06K 9/20* (2006.01)
*G06K 9/46* (2006.01)

(52) U.S. Cl.
CPC ......... *G06K 9/00771* (2013.01); *G06K 9/209* (2013.01); *G06K 9/4652* (2013.01); *G05B 2219/33192* (2013.01); *G05B 2219/36167* (2013.01); *G05B 2219/50198* (2013.01); *Y10S 901/49* (2013.01)

(56) References Cited

U.S. PATENT DOCUMENTS

| | | | |
|---|---|---|---|
| 9,782,898 | B2 | 10/2017 | Inagaki et al. |
| 2009/0128079 | A1* | 5/2009 | Sjoberg .................. B25J 13/06 318/568.13 |
| 2010/0106299 | A1 | 4/2010 | Nagata |
| 2011/0021234 | A1* | 1/2011 | Tibbitts ................ H04W 48/04 455/517 |
| 2012/0240959 | A1* | 9/2012 | Harter ...................... B60S 3/04 134/18 |
| 2013/0158709 | A1* | 6/2013 | Shi ............................ B25J 5/02 700/259 |
| 2014/0277613 | A1* | 9/2014 | Love ......................... A63J 1/02 700/83 |
| 2015/0331398 | A1* | 11/2015 | Love ..................... G05B 15/02 700/275 |
| 2016/0016096 | A1* | 1/2016 | Fisher ................ G05B 19/0421 700/90 |
| 2018/0113435 | A1* | 4/2018 | Tateoka ................. B25J 9/1674 |

FOREIGN PATENT DOCUMENTS

| | | |
|---|---|---|
| CN | 105437229 A | 3/2016 |
| DE | 102014216982 A1 | 3/2016 |
| EP | 1712965 A1 | 10/2006 |
| JP | 2004-355195 A | 12/2004 |
| JP | 2014167681 A | 9/2014 |

OTHER PUBLICATIONS

"Physical button (i.e., Air Button) attached to the back of the smartphone—NFC-capable and battery-free—", Japan, Oct. 28, 2015, 5 pages.

Notice of Reasons for Rejection for Japanese Application No. 2016-207850, dated Mar. 6, 2018, including partial English translation, 5 pages.

* cited by examiner

DURING EMERGENCY STOP

NOT DURING EMERGENCY STOP

DURING EMERGENCY STOP

DURING EMERGENCY STOP

NOT DURING EMERGENCY STOP

NOT DURING EMERGENCY STOP

FIG. 10A
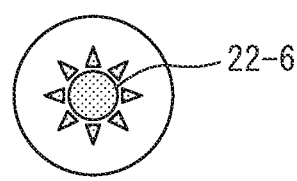
FIG. 10B  DURING EMERGENCY STOP
FIG. 10C  NOT DURING EMERGENCY STOP
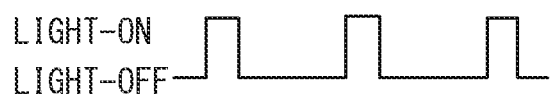
FIG. 10D  WHEN EMERGENCY STOP SWITCH IS DETACHED

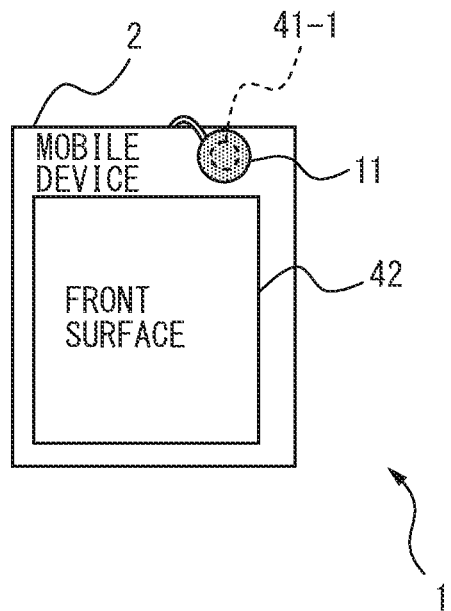
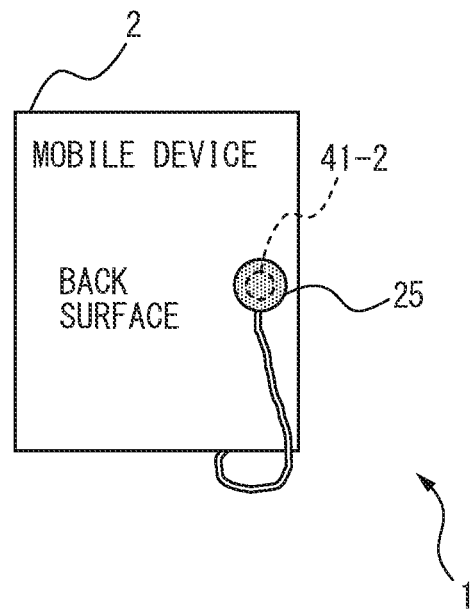

EMERGENCY STOP SYSTEM ATTACHED TO MOBILE DEVICE

BACKGROUND OF THE INVENTION

1. Field of the Invention

The present invention relates to an emergency stop system which performs an emergency stop of a machine operated by a mobile device.

2. Description of the Related Art

To operate a robot, a CNC machine tool, or the like (hereinafter, simply referred to as "machine"), a portable wireless teaching pendant connected to a controller of the machine via wireless communication is used. In such a machine system, in order to avoid an unexpected motion of the robot or the machine to ensure safety of a neighboring machine and operator, an emergency stop button is provided to the wireless teaching pendant.

FIG. 17 is a schematic diagram of an ordinary machine system constituted by a controller of a robot and a wireless teaching pendant. A controller 102 which controls a robot 103 and a portable wireless teaching pendant 101 are connected to each other via wireless communication. Using the wireless teaching pendant 101, the operator can perform registration and editing of an operation program, condition setting, and state display with respect to the robot 103, teaching of the robot 103, and the like. Further, from the wireless teaching pendant 101 to the controller 102, an emergency stop signal indicative of an emergency stop or no emergency stop is transmitted at a certain period of time. During a normal time in which an emergency stop switch (not illustrated) provided to the wireless teaching pendant 101 is not pushed down, from the wireless teaching pendant 101 to the controller 102, an emergency stop signal indicative of no emergency stop is transmitted at a certain period of time. When the emergency stop switch provided to the wireless teaching pendant 101 is pushed down by the operator, from the wireless teaching pendant 101 to the controller 102, an emergency stop signal indicative of an emergency stop of the robot 103 is transmitted at a certain period of time, and the controller 102 as receiving such an emergency stop signal performs an emergency stop of the robot 103, thereby being capable of ensuring safety of the robot 103, such a neighboring machine, and the operator. Note that herein, a case in which the robot 103 is controlled by the wireless teaching pendant 101 has been described by way of example, but a case in which a CNC machine tool is controlled by the wireless teaching pendant is also similar.

Further, in recent years, in view of reducing costs, assuring versatility, and the like, a machine system in which a robot or a CNC machine tool is operated not by an exclusive wireless teaching pendant but by a mobile device (information mobile terminal), such as a tablet or a smart phone, has been used, and also in such a machine system, an emergency stop switch is to be provided.

For example, as disclosed in Japanese Unexamined Patent Publication (Kokai) No. 2004-355195, a technique in which in a teaching operation device for a robot using a personal digital assistant (PDA), an emergency stop command device provided with an emergency stop switch and a deadman switch is connected to the PDA through a connector has been known.

As described above, the machine system in which a robot or a CNC machine tool is operated by a mobile device, such as a tablet and a smart phone, is advantageous compared to a case in which an exclusive wireless teaching pendant is used in view of reducing costs, assuring versatility, and the like, but also in such a machine system, an emergency stop switch is provided.

In the teaching operation device for a robot as disclosed in Japanese Unexamined Patent Publication (Kokai) No. 2004-355195, a wired connection not only between the PDA and the emergency stop command device but also between the emergency stop command device and a robot controller is to be provided, which is poor in mobility.

Other than above, a method in which an emergency stop switch is displayed as an icon on a touch panel of a mobile device to realize an emergency stop system in a software manner can be also designed. For example, a mechanical emergency stop switch is provided with a physical "protrusion" so that the operator can perform an operation without watching the emergency stop switch. However, in a case of the emergency stop switch in the form of icon displayed on the touch panel, the operator is to always keep an eye on the touch panel, which is inferior in easiness of intuitive operations compared to the mechanical emergency stop switch. Further, depending on use environments of the mobile device, an appearance of the touch panel changes due to surrounding light conditions, and recognizing the emergency stop switch in the form of icon may be difficult. In addition, it is also possible that the emergency stop switch in the form of icon cannot be recognized due to a failure of a display function of the touch panel. Further, in a state in which water drops are on the touch panel and in a state in which the operator wears gloves, a touch operation by the operator on the touch panel may not be correctly recognized, and therefore safety cannot be ensured.

SUMMARY OF INVENTION

A low-cost and convenient emergency stop system which can reliably perform an emergency stop of a robot or a CNC machine tool operated by a mobile device has been desired.

According to one aspect of the present disclosure, an emergency stop system which performs an emergency stop of a machine operated by a mobile device includes: an emergency stop switch including an operation button, a state output unit which outputs a state different in accordance with whether or not the operation button is pushed down, and an attachment unit which attaches the operation button and the state output unit to the mobile device in a detachable manner in such a manner that the state of the state output unit is positioned at a side facing a camera of the mobile device at the time of attachment to the mobile device; and an information processing unit determines in accordance with an image related to the state of the state output unit as imaged by the camera of the mobile device whether to output an emergency stop signal indicating an emergency stop of the machine operated by the mobile device or to output an emergency stop signal indicating no emergency stop of the machine.

Herein, the information processing unit may include a determination unit which determines whether or not an image related to the state of the state output unit as imaged by the camera of the mobile device is an image when the operation button is pushed down, and a signal generation unit which generates an emergency stop signal indicating an emergency stop of the machine when the determination unit determines that the image as imaged by the camera of the mobile device is an image when the operation button is pushed down and generates an emergency stop signal indicating no emergency stop of the machine when the determination unit determines that the image is an image when the operation button is not pushed down.

Further, the information processing unit may be provided in the mobile device.

Further, the emergency stop system may further include a transmission unit which transmits the image as imaged by the camera of the mobile device to a controller that controls the machine operated by the mobile device, wherein the information processing unit may be provided in the controller.

Further, the state of the state output unit may be a color different in at least one of hue, brightness, and saturation depending on whether the operation button is pushed down or whether the operation button is not pushed down.

Further, the state of the state output unit may be a color different in at least one of a shape and a figure depending on whether the operation button is pushed down or whether the operation button is not pushed down.

Further, the state output unit may be an illumination element which illuminates toward a side facing the camera of the mobile device, and an illumination state of the illumination element differs depending on whether the operation button is pushed down or whether the operation button is not pushed down.

Further, the information processing unit may output an emergency stop signal indicating an emergency stop of the machine when an image related to an illumination state of the illumination element as imaged by the camera of the mobile device indicates that other than each illumination state when the operation button is pushed down and when the operation button is not pushed down, each illumination state being prescribed in advance.

Further, the information processing unit may output an emergency stop signal indicating an emergency stop of the machine when the camera of the mobile device fails to image a state of the state output unit.

Further, the state output unit may be attached for each of two cameras provided to a first surface and a second surface of the mobile device, respectively, using the attachment unit.

Further, the emergency stop switch may further include a touch panel input unit which comes into contact with a touch panel of the mobile device when the operation button is pushed down and fails to come into contact with the touch panel when the operation button is not pushed down, wherein the information processing unit may output an emergency stop signal indicating an emergency stop of the machine when the touch panel input unit comes into contact with the touch panel.

BRIEF DESCRIPTION OF THE DRAWINGS

The present invention will be more clearly understood with reference to the following accompanying drawings:

FIG. 10A is a schematic diagram illustrating another example of the state output unit in the emergency stop system according to the embodiment of the present disclosure and is a plan view schematically illustrating an illumination element as seen from a camera side;

FIG. 10B is a schematic diagram illustrating another example of the state output unit in the emergency stop system according to the embodiment of the present disclosure and illustrates a waveform pattern imaged by a camera during an emergency stop;

FIG. 10C is a schematic diagram illustrating another example of the state output unit in the emergency stop system according to the embodiment of the present disclosure and illustrates a waveform pattern imaged by the camera not during an emergency stop;

FIG. 10D is a schematic diagram illustrating another example of the state output unit in the emergency stop system according to the embodiment of the present disclosure and illustrates a waveform pattern imaged by the camera when the emergency stop switch is detached from the mobile device;

FIG. 11A is a diagram illustrating a doubled push-down detection structure of an operation button in the emergency stop system according to the embodiment of the present disclosure and illustrates a front surface of the mobile device;

FIG. 11B is a diagram illustrating the doubled push-down detection structure of the operation button in the emergency stop system according to the embodiment of the present disclosure and illustrates a back surface of the mobile device;

DETAILED DESCRIPTION

Next, embodiments of the present disclosure will be described with reference to the drawings. In the following drawings, similar members are provided with similar reference signs. To facilitate understanding, these figures are suitably changed in scale. Further, embodiments as illustrated in the figures are one example so as to carry out one aspect of the present disclosure and such embodiments are not limitative.

Figure 1A:
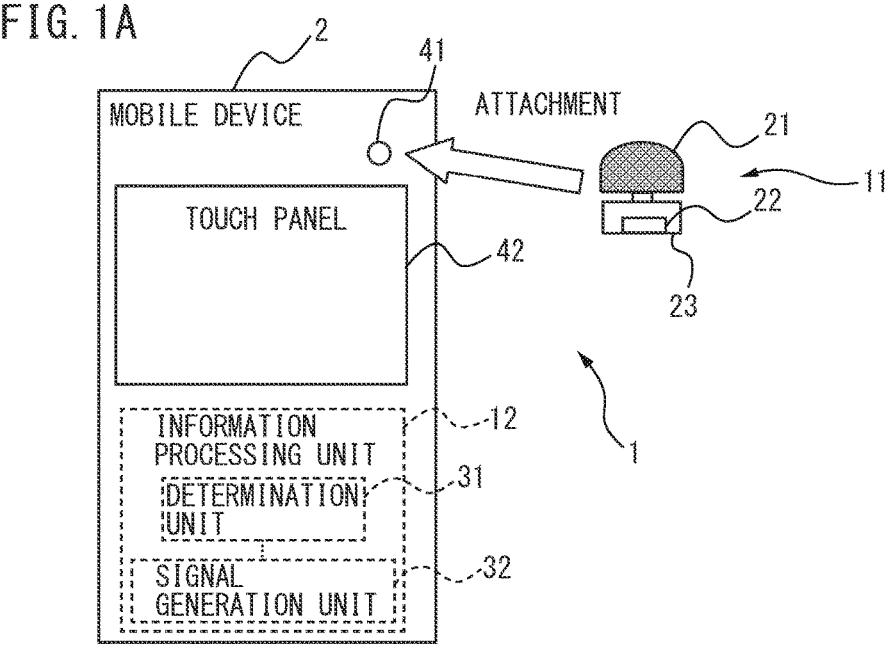
FIG. 1A is a diagram illustrating an emergency stop system according to an embodiment of the present disclosure and illustrates that an emergency stop switch is not yet attached to a mobile device.
Figure 1B:
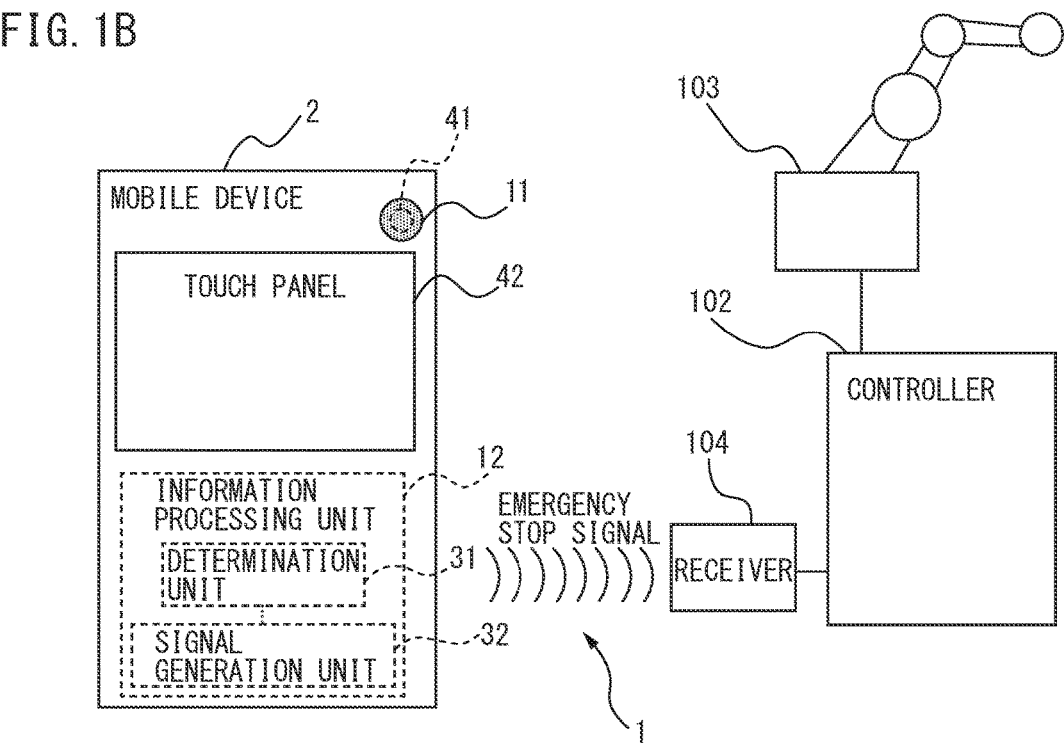
FIG. 1B is a diagram illustrating the emergency stop system according to the embodiment of the present disclosure and illustrates a state in which the emergency stop switch is attached to the mobile device.

FIG. 1A is a diagram illustrating an emergency stop system according to an embodiment of the present disclosure and illustrates that an emergency stop switch is not yet attached to a mobile device. FIG. 1B is a diagram illustrating the emergency stop system according to the embodiment of the present disclosure and illustrates a state in which the emergency stop switch is attached to the mobile device. Hereinafter, it is to be understood that a component provided with the same reference sign in different drawings designates the component having the same function.

Examples of a machine operated by a mobile device 2 may include a robot or a CNC machine tool, and herein, a case in which the robot 103 is operated will be described by way of example. When the machine operated by the mobile device 2 is a CNC machine tool, the term "robot 103" in the below description is replaced by the term "CNC machine tool".

The mobile device 2 is a device provided with a camera 41 and a touch panel 42, and may be, for example, a tablet and a smart phone. In addition, a notebook personal computer having a camera and a wireless communication function may be designed to be the mobile device 2 to which the present embodiment is applied. In the mobile device 2, in a storage unit (not illustrated) therein, a teaching software program which performs registration and editing of an operation program, condition setting, and state display with respect to the robot 103, teaching of the robot 103, and the like is installed, and an arithmetic processing unit (not illustrated) similarly therein operates in accordance with the teaching software program installed in the storage unit, whereby the mobile device 2 functions as a wireless teaching pendant which operates (teaches) the robot 103. The mobile device 2 and a receiver 104 of the controller 102 which controls the robot 103 are connected to each other via wireless communication.

An emergency stop system 1 according to the present embodiment is an emergency stop system which performs an emergency stop of the machine (the robot 103 by way of example in the drawings) operated by the mobile device 2, and includes an emergency stop switch 11 and an information processing unit 12.

The emergency stop switch 11 includes an operation button 21, a state output unit 22 which outputs a state different in accordance with whether or not the operation button 21 is pushed down, and an attachment unit 23 which attaches the operation button 21 and the state output unit 22 to the mobile device 2 in a detachable manner. According to the present embodiment, the operation button 21 which "physically protrudes" is provided to the emergency stop switch 11 so that the operator can easily perform a button push-down operation at the time of an emergency and reliably perform an emergency stop of the robot 103 operated by the mobile device 2, which exhibits high safety. Note that specific examples of the state output unit 22 and the attachment unit 23 will be later described.

An emergency stop signal is a signal which indicates whether or not to perform an emergency stop of the robot 103 operated by the mobile device 2, and is outputted at a certain period of time from the information processing unit 12 to the receiver 104 of the controller 102 which controls the robot 103. When the operation button 21 is not pushed down (i.e., during a normal time), an emergency stop signal indicating no emergency stop of the robot 103 is outputted at a certain period of time. When the operation button 21 is pushed down, a signal outputted from the information processing unit 12 is switched from an emergency stop signal indicating no emergency stop of the robot 103 to an emergency stop signal indicating an emergency stop of the robot 103. In other words, the information processing unit 12 determines in accordance with an image related to the state of the state output unit 22 as imaged by the camera 41 of the mobile device 2 whether to output an emergency stop signal indicating an emergency stop of the robot 103 operated by the mobile device 2 or to output an emergency stop signal indicating no emergency stop of the robot 103. Thus, the information processing unit 12 includes a determination unit 31 which determines whether or not an image related to the state of the state output unit 22 as imaged by the camera 41 of the mobile device 2 is an image when the operation button 21 is pushed down and a signal generation unit 32 which generates an emergency stop signal indicating an emergency stop of the robot 103 when the determination unit 31 determines that the image as imaged by the camera 41 of the mobile device 2 is an image when the operation button 21 is pushed down and generates an emergency stop signal indicating no emergency stop of the robot 103 when the determination unit 31 determines that the image is an image when the operation button 21 is not pushed down. In other words, in the present embodiment, the state output unit 22 outputs a state different in accordance with whether or not the operation button 21 is pushed down, the camera 41 of the mobile device 2 periodically images the same at a certain sampling rate, and the determination unit 31 in the information processing unit 12 determines whether or not an image as imaged by the camera 41 is an image when the operation button 21 is pushed down. Since an image as imaged by the camera 41 changes depending on whether or not the operation button 21 is pushed down, the signal generation unit 32 in the information processing unit 12 generates in accordance with the image as imaged by the camera 41 an emergency stop signal indicating an emergency stop of the robot 103 or an emergency stop signal indicating no emergency stop of the robot 103. To thus determine whether to generate an emergency stop signal indicating an emergency stop of the robot 103 is generated or to generate an emergency stop signal indicating no emergency stop of the robot 103, the information processing unit 12 is to hold in advance in a storage unit (not illustrated) an image related to each state of the state output unit 22 corresponding to whether or not the operation button 21 is pushed down. Further, it may be also configured that the information processing unit 12 outputs an emergency stop signal indicating an emergency stop of the robot 103 when the camera 41 of the mobile device 2 fails to image a state of the state output unit 22. In other words, when the emergency stop switch 11 is detached from the mobile device 2, an image related to a state of the state output unit 22 as imaged by the camera 41 of the mobile device 2 fails to correspond to any of each state of the state output unit 22 when the operation button 21 is pushed down and when the operation button 21 is not pushed down which is prescribed in advance and held in the storage unit, and consequently, also in such a case, the signal generation unit 32 in the information processing unit 12 is configured to generate an emergency stop signal indicating an emergency stop of the robot 103 so that safety is further improved.

An emergency stop signal indicating an emergency stop or no emergency stop which is generated by the signal generation unit 32 in the information processing unit 12 as described above is outputted at a certain period of time and received by the controller 102 through the receiver 104. The controller 102 as receiving an emergency stop signal indicating an emergency stop performs an emergency stop of the robot 103, thereby being capable of ensuring safety of the robot 103, such a neighboring machine, and the operator. Further, to further improve safety, also when the controller 102 cannot receive an emergency stop signal itself indicating an emergency stop or no emergency stop, the controller 102 performs an emergency stop of the robot 103.

Note that in the embodiment as illustrated in FIG. 1, the information processing unit 12 is provided in the mobile device 2. The determination unit 31 and the signal generation unit 32 may be configured, e.g., in the form of a software program or may be configured by a combination of each type of electronic circuits and a software program. For example, when such units are configured in the form of a software program, in the storage unit (not illustrated) in the mobile device 2, such software program is installed, and the arithmetic processing unit (not illustrated) in the mobile device 2 operates in accordance with such software program installed in the storage unit, thereby realizing a function of the determination unit 31 and the signal generation unit 32. Further, alternatively, the determination unit 31 and the signal generation unit 32 may be realized as a semiconductor integrated circuit in which a software program that realizes a function of such respective units is written, and in such a case, such semiconductor integrated circuit is incorporated in the mobile device 2 to realize a function of the determination unit 31 and the signal generation unit 32. In the embodiment as illustrated in FIG. 1, the information processing unit 12 is provided in the mobile device 2, but as described later, may be provided in the controller 102 which controls the robot 103.

Subsequently, specific examples of the attachment unit 23 will be described with reference to FIGS. 2-4. The attachment unit 23 attaches the emergency stop switch 11 to the mobile device 2 in such a manner that a state outputted by the state output unit 22 is positioned at a side facing the camera 41 of the mobile device 2.

Figure 2:
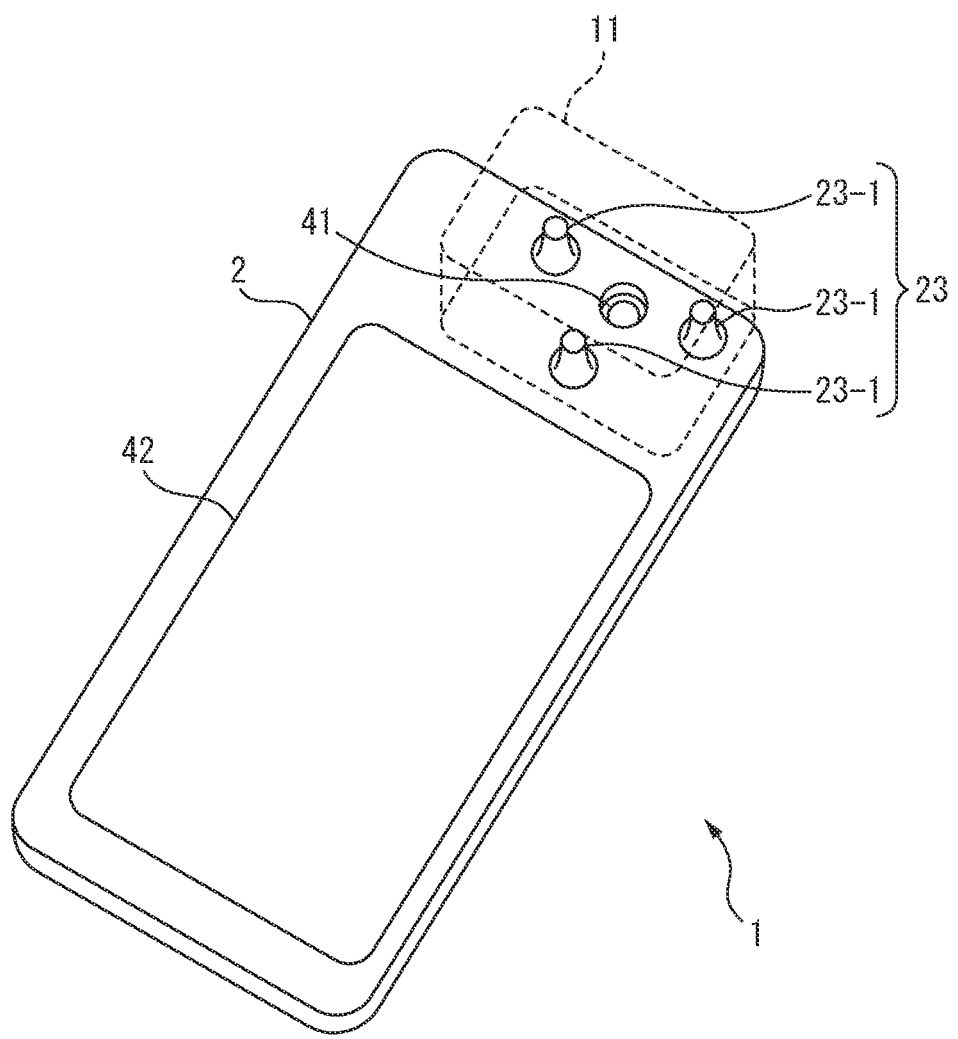
FIG. 2 is a perspective view illustrating a first specific example of an attachment unit in the emergency stop system according to the embodiment of the present disclosure.

FIG. 2 is a perspective view illustrating a first specific example of the attachment unit in the emergency stop system according to the embodiment of the present disclosure. According to the first specific example, the attachment unit 23 is constituted by a suction cup 23-1. The suction cup 23-1 is provided at the same surface side as the state output unit 22 of the emergency stop switch 11 in such a manner that a state outputted by the state output unit 22 is positioned at a side facing the camera 41 of the mobile device 2. Further, when the suction cup 23-1 is made of a non-transparent material, a state outputted by the state output unit 22 is to be imaged by the camera 41 so that the suction cup 23-1 is provided at a position failing to fall within an imaging scope of the camera 41. In the example as illustrated in FIG. 2, the number of the suction cups 23-1 is three but may be the other numbers. Note that in FIG. 2, illustration of the state output unit 22 is omitted.

Figure 3:
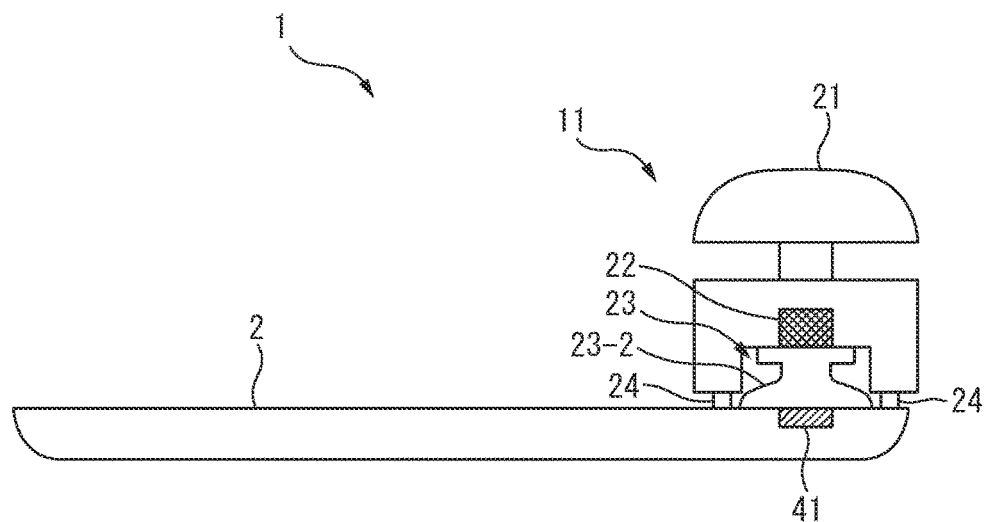
FIG. 3 is a cross-sectional view illustrating a second specific example of the attachment unit in the emergency stop system according to the embodiment of the present disclosure.

FIG. 3 is a cross-sectional view illustrating a second specific example of the attachment unit in the emergency stop system according to the embodiment of the present disclosure. The suction cup 23-1 according to the first specific example as described above is made of a non-transparent material, whereas the attachment unit 23 according to the second specific example is constituted by a transparent suction cup 23-2. In such a case, similarly to the first specific example, the suction cup 23-2 is provided at the same surface side as the state output unit 22 of the emergency stop switch 11 in such a manner that a state outputted by the state output unit 22 is positioned at a side facing the camera 41 of the mobile device 2. Note that the suction cup 23-2 according to the second specific example is made of a transparent material so as to be, different from the case of the first specific example, capable of being provided at a position falling between the state output unit 22 and the camera 41. A state outputted by the state output unit 22 penetrates the suction cup 23-2 positioned within an imaging scope of the camera 41 and is imaged by the camera 41. Note that in the example as illustrated in FIG. 3, not to provide a surface of the mobile device 2 with scratches in attaching the emergency stop switch 11 to the mobile device 2 through the attachment unit 23 (suction cup 23-2), a cushion member 24 is provided at a mobile device 2 side of the emergency stop switch 11. The cushion member 24 is made of a soft material, such as a rubber and a sponge. Note that the emergency stop switch 11 in the first specific example as illustrated in FIG. 2 may also be provided with the cushion member 24.

Figure 4:
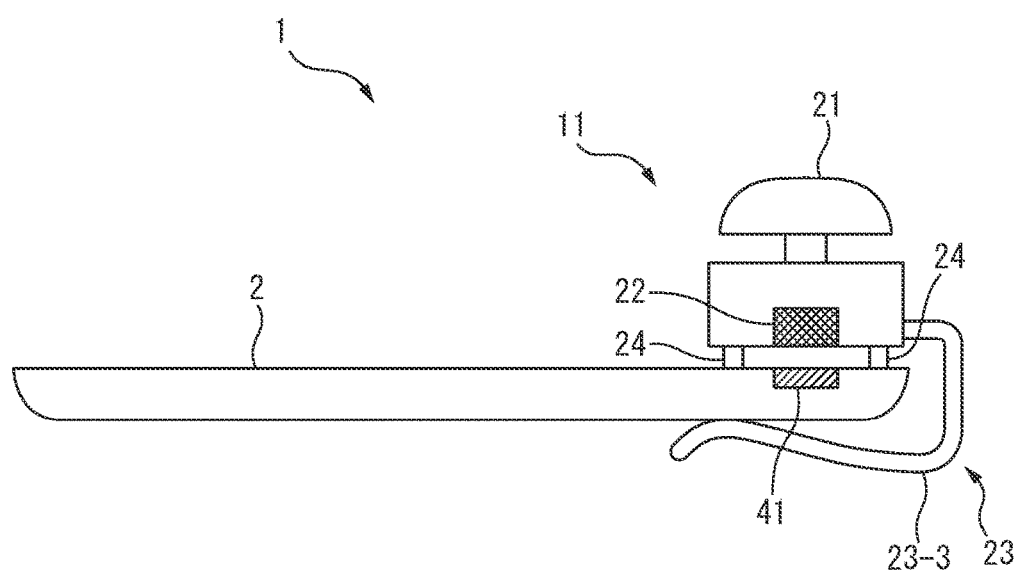
FIG. 4 is a cross-sectional view illustrating a third specific example of the attachment unit in the emergency stop system according to the embodiment of the present disclosure.

FIG. 4 is a cross-sectional view illustrating a third specific example of the attachment unit in the emergency stop system according to the embodiment of the present disclosure. The attachment unit 23 according to the third specific example is constituted by a clip 23-3. The clip 23-3 attaches the emergency stop switch 11 to the mobile device 2 in such a manner that a state outputted by the state output unit 22 is positioned at a side facing the camera 41 of the mobile device 2. Note that in the example as illustrated in FIG. 4, not to provide the surface of the mobile device 2 with scratches in attaching the emergency stop switch 11 to the mobile device 2 through the attachment unit 23 (clip 23-3), the cushion member 24 is provided at the mobile device 2 side of the emergency stop switch 11. Although unillustrated in FIG. 4, the cushion member 24 may be also provided at a mobile device 2 side of the clip 23-3.

Subsequently, specific examples of the state output unit 22 will be described with reference to FIGS. 5A-10D.

As described above, in the embodiment of the present disclosure, the state output unit 22 outputs a state different in accordance with whether or not the operation button 21 is pushed down, and the information processing unit 12 determines in accordance with the state of the state output unit 22 as imaged by the camera 41 of the mobile device 2 whether to output an emergency stop signal indicating an emergency stop of the robot 103 or to output an emergency stop signal indicating no emergency stop of the robot 103. In other words, whether to output an emergency stop signal indicating an emergency stop of the robot 103 or to output an emergency stop signal indicating no emergency stop of the robot 103 depends on an image related to a "state of the state output unit 22 depending on whether or not the operation button 21 is pushed down" as imaged by the camera 41. Thus, the state different depending on whether or not the operation button 21 is pushed down may be anything that can be processed to be determined by the determination unit 31 in the information processing unit 12 based on the image as imaged by the camera 41. Some examples will now be described below.

Figure 5A:
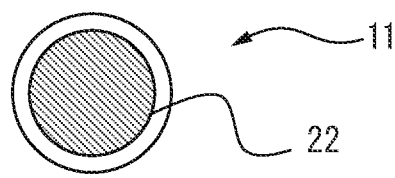
FIGS. 5A and 5B are schematic diagrams illustrating a case in which a state outputted by a state output unit is a color in the emergency stop system according to the embodiment of the present disclosure.
Figure 5B:
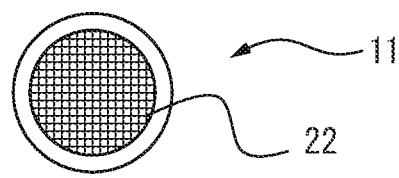

FIGS. 5A and 5B are schematic diagrams illustrating a case in which a state outputted by the state output unit is a color in the emergency stop system according to the embodiment of the present disclosure. As illustrated in FIGS. 5A and 5B, a state outputted by the state output unit 22 and different in accordance with whether or not the operation button 21 is pushed down includes a color different in at least one of hue, brightness, and saturation depending on whether the operation button 21 is pushed down or whether the operation button 21 is not pushed down. Since a color is determined by a suitable combination of hue (tint), brightness (lightness), and saturation (vividness), if at least one of hue, brightness, and saturation is different, a color as imaged by the camera 41 is also different. In FIGS. 5A and 5B, for the sake of convenient illustration, a difference in color is illustrated by a difference in hatching, and for example, FIG. 5A illustrates a color (e.g., red) of the state output unit 22 during an emergency stop as seen from a camera 41 side and FIG. 5B illustrates the color (e.g., yellow) of the state output unit 22 not during an emergency stop as seen from the camera 41 side.

Figure 6A:
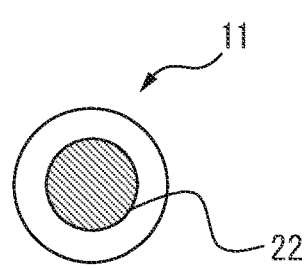
FIGS. 6A-6D are schematic diagrams illustrating a case in which a state outputted by the state output unit is a form in the emergency stop system according to the embodiment of the present disclosure.
Figure 6B:
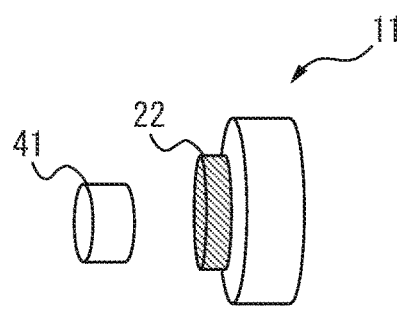
Figure 6C:
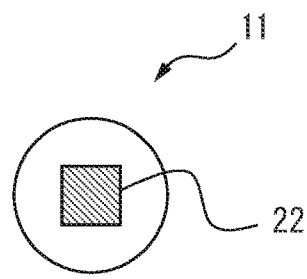
Figure 6D:
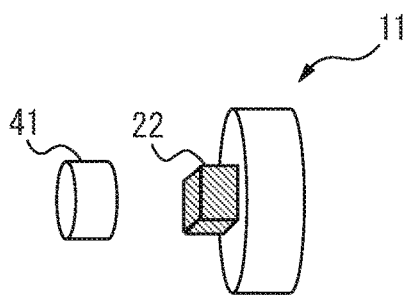

FIGS. 6A-6D are schematic diagrams illustrating a case in which a state outputted by the state output unit is a form in the emergency stop system according to the embodiment of the present disclosure. As illustrated in FIGS. 6A-6D, a state outputted by the state output unit 22 and different in accordance with whether or not the operation button 21 is pushed down includes a form different in at least one of a shape and a figure depending on whether the operation button 21 is pushed down or whether the operation button 21 is not pushed down. In FIGS. 6A-6D, by way of example, a form of the state output unit 22 during an emergency stop is a circle (or a cylinder) and the form of the state output unit 22 not during an emergency stop is a square (or a rectangular prism). FIG. 6A schematically illustrates the form of the state output unit 22 during an emergency stop as seen from the camera 41 side, FIG. 6B schematically illustrates the form of the state output unit 22 during an emergency stop as seen in a perspective manner, FIG. 6C schematically illustrates the form of the state output unit 22 not during an emergency stop as seen from the camera 41 side, and FIG. 6D schematically illustrates the form of the state output unit 22 not during an emergency stop as seen in a perspective manner.

A color constituted by a combination of hue, brightness, and saturation as described with reference to FIGS. 5A and 5B and a form constituted by a combination of a shape and a figure as described with reference to FIG. 6 are not separate and independent ideas to provide a state of the state output unit 22, but a suitable combination of a color and a form may be provided as a "state of the state output unit 22 depending on whether or not the operation button 21 is pushed down". In other words, the state output unit 22 may provide such a difference of a state that each capacity, such as a resolution of the camera 41 and a processing capacity of the information processing unit 12, enables distinction of whether or not the operation button 21 is pushed down.

Figure 7A:
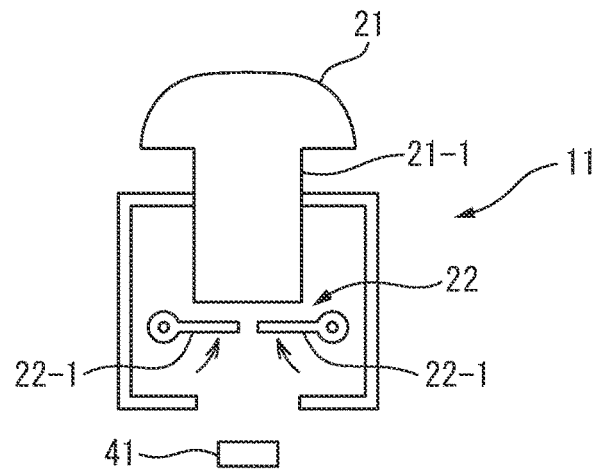
FIGS. 7A-7D are diagrams illustrating a first specific example of a structure of the state output unit in the emergency stop system according to the embodiment of the present disclosure.
Figure 7B:
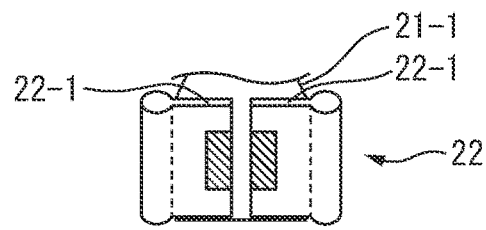
Figure 7C:
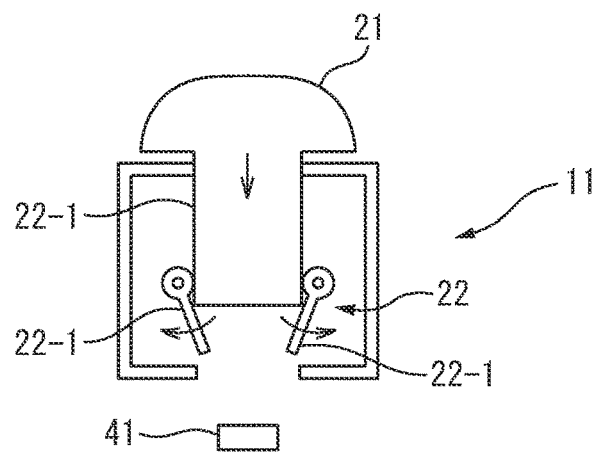
Figure 7D:
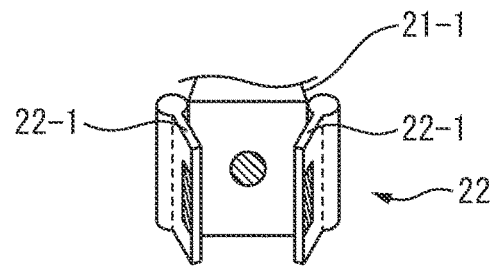

FIGS. 7A-7D are diagrams illustrating a first specific example of a structure of the state output unit in the emergency stop system according to the embodiment of the present disclosure. In other words, FIG. 7A is a cross-sectional view illustrating the structure of the state output unit 22 when the operation button 21 is not pushed down, FIG. 7B is a partial perspective view illustrating the structure of the state output unit 22 of FIG. 7A, FIG. 7C is a cross-sectional view illustrating the structure of the state output unit 22 when the operation button 21 is pushed down, and FIG. 7D is a partial perspective view illustrating the structure of the state output unit 22 of FIG. 7C. The state output unit 22 according to the first specific example includes a door 22-1 which opens and closes in accordance with whether or not the operation button 21 is pushed down. At a side of the door 22-1 facing the camera 41, for example, a square is described, and at a side of a support frame 21-1 of the operation button 21 facing the camera 41, for example, a circle is described. As illustrated in FIGS. 7A and 7B, when the operation button 21 is not pushed down, the door 22-1 is closed, and consequently the camera 41 images the square described on the door 22-1. As illustrated in FIGS. 7C and 7D, when the operation button 21 is pushed down, the support frame 21-1 of the operation button 21 pushes and opens the door 22-1 and the door 22-1 is opened, and consequently the camera 41 images the circle described on the support frame 21-1.

Figure 8A:
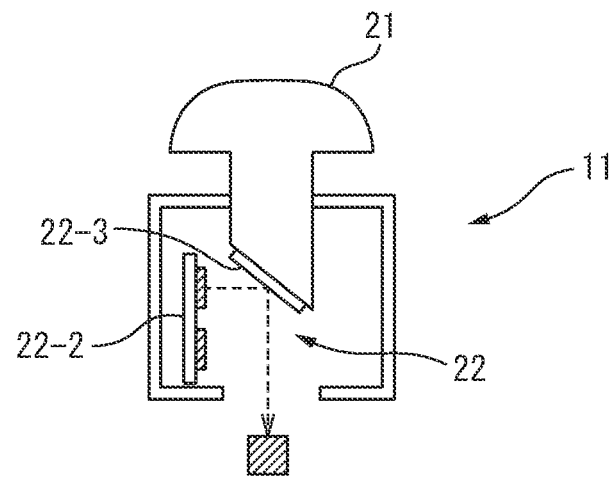
FIGS. 8A-8C are diagrams illustrating a second specific example of the structure of the state output unit in the emergency stop system according to the embodiment of the present disclosure.
Figure 8B:
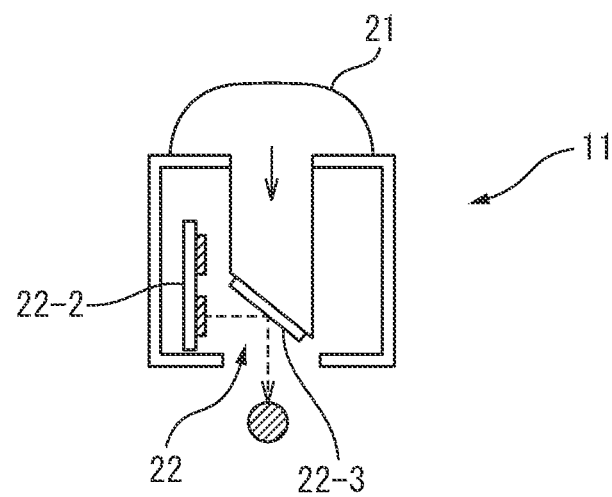
Figure 8C:
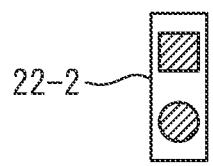

FIGS. 8A-8C are diagrams illustrating a second specific example of the structure of the state output unit in the emergency stop system according to the embodiment of the present disclosure. In other words, FIG. 8A is a cross-sectional view illustrating the structure of the state output unit 22 when the operation button 21 is not pushed down, FIG. 8B is a cross-sectional view illustrating the structure of the state output unit 22 when the operation button 21 is pushed down, and FIG. 8C is a plan view illustrating a display plate 22-2 on which a form is described. The state output unit 22 according to the second specific example includes the display plate 22-2 on which two forms are described and a mirror 22-3 which reflects the forms described on the display plate 22-2 in a direction in which the camera 41 is positioned. As illustrated in FIG. 8C, on the display plate 22-2, for example, a square and a circle are described. The display plate 22-2 may be, for example, one in which the forms are described directly on a plate or one in which a label on which the forms are described is adhered to a plate. Further, alternatively, one in which the forms are directly described on an inner side of a casing of the emergency stop switch 11 or one in which a label on which the forms are described is adhered to the inner side of the casing of the emergency stop switch 11 may be suitable. Depending on whether the operation button 21 is not pushed down as illustrated in FIG. 8A or whether the operation button 21 is pushed down as illustrated in FIG. 8B, a position of the mirror 22-3 relative to the display plate 22-2 differs, and accordingly an image as imaged by the camera 41 differs.

Figure 9A:
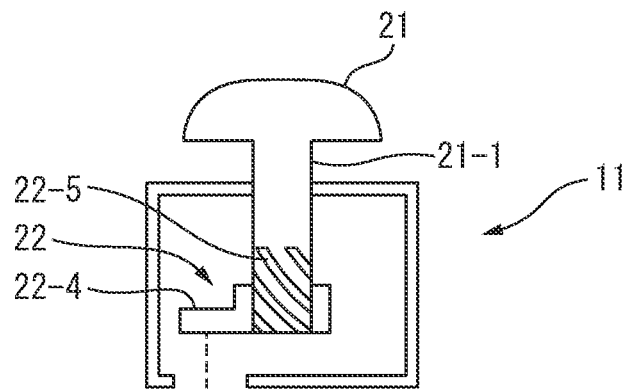
FIGS. 9A-9D are diagrams illustrating a third specific example of the structure of the state output unit in the emergency stop system according to the embodiment of the present disclosure.
Figure 9B:
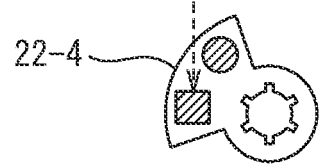
Figure 9C:
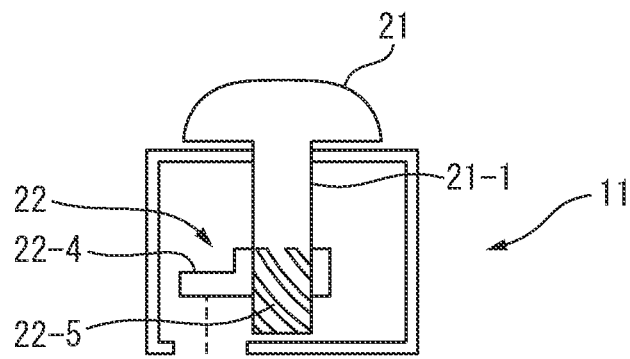
Figure 9D:
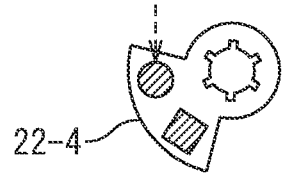

FIGS. 9A-9D are diagrams illustrating a third specific example of the structure of the state output unit in the emergency stop system according to the embodiment of the present disclosure. In other words, FIG. 9A is a cross-sectional view illustrating the structure of the state output unit 22 when the operation button 21 is not pushed down, FIG. 9B is a plan view illustrating the structure of the state output unit 22 as seen from a camera 41 side of FIG. 9A, FIG. 9C is a cross-sectional view illustrating the structure of the state output unit 22 when the operation button 21 is pushed down, and FIG. 9D is a plan view illustrating the structure of the state output unit 22 as seen from a camera 41 side of FIG. 9C. The state output unit 22 according to the third specific example includes a display device 22-4 on which two forms are described and a groove 22-5 spirally cut in the support frame 21-1 of the operation button 21, and has a screw structure in which the display device 22-4 rotates along the groove 22-5 by a linear movement of the support frame 21-1. As illustrated in FIGS. 9B and 9D, on the display device 22-4, for example, a square and a circle are described. The display plate 22-2 may be, for example, one in which the forms are described directly on a plate or one in which a label on which the forms are described is adhered to a plate. As illustrated in FIGS. 9A and 9B, when the operation button 21 is not pushed down, the camera 41 images the square described on the display device 22-4. As illustrated in FIGS. 9C and 9D, when the operation button 21 is not pushed down, the display device 22-4 rotates along the groove 22-5 spirally cut in the support frame 21-1, and the camera 41 images the circle described on the display device 22-4.

In the description of the first to third specific examples with respect to the structure of the state output unit 22 as described with reference to FIGS. 7A-9D, a state outputted by the state output unit 22 is a form related to a square and a circle, which is, however, only illustrative, and as described above, a suitable combination of a color constituted by a combination of hue, brightness, and saturation as described with reference to FIGS. 5A and 5B and a form constituted by a combination of a shape and a figure as described with reference to FIGS. 6A-6D is described on the support frame 21-1, the display plate 22-2, and the display device 22-4 as a "state of the state output unit 22 depending on whether or not the operation button 21 is pushed down".

FIG. 10A is a schematic diagram illustrating another example of the state output unit in the emergency stop system according to the embodiment of the present disclosure and is a plan view schematically illustrating an illumination element as seen from a camera side. FIG. 10B is a schematic diagram illustrating another example of the state output unit in the emergency stop system according to the embodiment of the present disclosure and illustrates a waveform pattern imaged by the camera during an emergency stop. FIG. 10C is a schematic diagram illustrating another example of the state output unit in the emergency stop system according to the embodiment of the present disclosure and illustrates a waveform pattern imaged by the camera not during an emergency stop. FIG. 10D is a schematic diagram illustrating another example of the state output unit in the emergency stop system according to the embodiment of the present disclosure and illustrates a waveform pattern imaged by the camera when the emergency stop switch is detached from the mobile device.

In examples as illustrated in FIGS. 10A-10D, the state output unit 22 is an illumination element 22-6 which illuminates toward a side facing the camera 41 of the mobile device 2. The state output unit 22 is constituted by the illumination element 22-6 so that even when an environment in which the mobile device 2 to which the emergency stop switch 11 is attached is used is dark and even under a light environment of a special color, the information processing unit 12 can determine in accordance with an image related to an illumination pattern of the illumination element 22-6 as imaged by the camera 41 of the mobile device 2 whether to output an emergency stop signal indicating an emergency stop of the robot 103 operated by the mobile device 2 or to output an emergency stop signal indicating no emergency stop of the robot 103. Examples of the illumination element 22-6 include an LED. Note that although unillustrated herein, a battery for illuminating the illumination element 22-6 and a control unit which controls an illumination pattern of the illumination element 22-6 are also mounted to the emergency stop switch 11. The control unit of the emergency stop switch 11 is configured to control an illumination pattern of the illumination element 22-6 depending on whether or not the operation button 21 is pushed down in such a manner that an illumination state of the illumination element 22-6 differs depending on whether the operation button 21 is pushed down (FIG. 10B) or whether the operation button 21 is not pushed down (FIG. 10C). While the camera 41 of the mobile device 2 to which the emergency stop switch 11 including the illumination element 22-6 is attached images an illumination pattern of the illumination element 22-6, to determine whether to generate an emergency stop signal indicating an emergency stop of the robot 103 is generated or to generate an emergency stop signal indicating no emergency stop of the robot 103, the information processing unit 12 is to hold in advance in a storage unit (not illustrated) an image related to each state of the state output unit 22 corresponding to whether or not the operation button 21 is pushed down. The illumination element 22-6 illuminates with an illumination pattern different in accordance with whether or not the operation button 21 is pushed down, the camera 41 of the mobile device 2 images the same, and the determination unit 31 in the information processing unit 12 determines whether or not an image as imaged by the camera 41 is an illumination pattern when the operation button 21 is pushed down. Since an illumination pattern as imaged by the camera 41 changes depending on whether or not the operation button 21 is pushed down, the signal generation unit 32 in the information processing unit 12 generates in accordance with the image as imaged by the camera 41 an emergency stop signal indicating an emergency stop of the robot 103 or an emergency stop signal indicating no emergency stop of the robot 103. Further, it may be also configured that the signal generation unit 32 in the information processing unit 12 generates and outputs an emergency stop signal indicating an emergency stop of the robot 103 also when an image related to an illumination state of the illumination element 22-6 as imaged by the camera 41 of the mobile device 2 fails to correspond to any of each illumination pattern when the operation button 21 is pushed down and when the operation button 21 is not pushed down which is prescribed in advance and held in the storage unit. When the emergency stop switch 11 is detached from the mobile device 2, an image as imaged by the camera 41 is such an image that the illumination element 22-6 is turned off as illustrated in FIG. 10D and consequently fails to correspond to any of each illumination pattern when the operation button 21 is pushed down and when the operation button 21 is not pushed down which is held in the storage unit, and consequently, and thus, the signal generation unit 32 in the information processing unit 12 is configured to generate and output an emergency stop signal indicating an emergency stop of the robot 103 so that safety is further improved.

As described above, the emergency stop system 1 according to the present embodiment can further reliably stop the robot 103 operated by a mobile device. Note that in the above description, a case in which the machine operated by the mobile device 2 is the robot 103 has been described, but the present embodiment can be similarly applied to a case of a CNC machine tool as well.

Subsequently, an embodiment in which a push-down detection structure of the operation button 21 in the emergency stop system 1 is doubled, thereby further reliably stopping the robot 103 operated by the mobile device 2 at the time of an emergency will be described with reference to FIGS. 11A-15B. Note that also in the below embodiment, similarly to the above, when the machine operated by the mobile device 2 is a CNC machine tool, the term "robot 103" in the below description is replaced by the term "CNC machine tool".

FIG. 11A is a diagram illustrating a doubled push-down detection structure of the operation button in the emergency stop system according to the embodiment of the present disclosure and illustrates a front surface of the mobile device. FIG. 11B is a diagram illustrating the doubled push-down detection structure of the operation button in the emergency stop system according to the embodiment of the present disclosure and illustrates a back surface of the mobile device. In general, in a tablet, a smart phone, and the like in recent years, both a front surface (first surface) and a back surface (second surface) thereof are provided with a camera. In the present embodiment, as illustrated in FIGS. 11A and 11B, to a camera 41-1 provided to the front surface (first surface) of the mobile device 2 and a camera 41-2 provided to the back surface (second surface) of the mobile device 2, the state output unit 22 and a sub-state output unit 25 of the emergency stop switch 11 are attached, respectively, thereby doubling the push-down detection structure of the operation button 21 and further improving safety. Specific examples thereof will be illustrated in FIGS. 12A-14C.

Figure 12A:
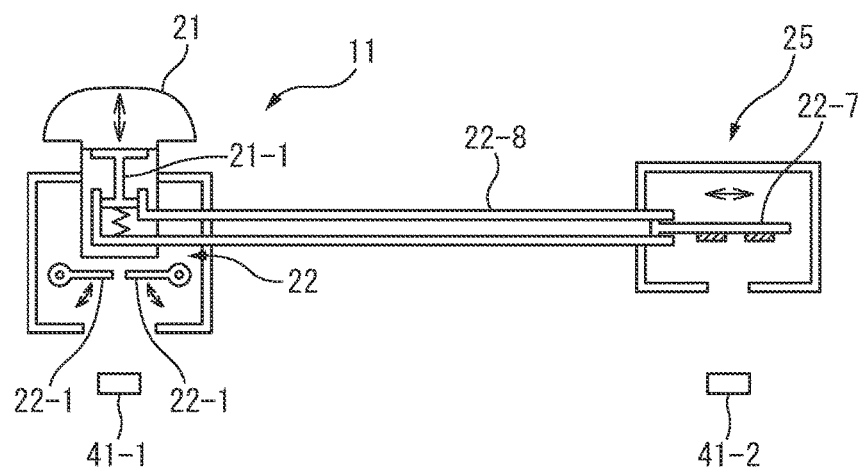
FIG. 12A is a diagram illustrating a first specific example of the doubled push-down detection structure of the operation button in the emergency stop system according to the embodiment of the present disclosure and is a cross-sectional view of the emergency stop switch.
Figure 12B:
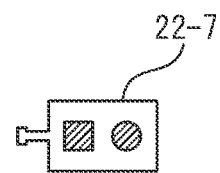
FIG. 12B is a diagram illustrating the first specific example of the doubled push-down detection structure of the operation button in the emergency stop system according to the embodiment of the present disclosure and illustrates a display plate.

FIG. 12A is a diagram illustrating a first specific example of the doubled push-down detection structure of the operation button in the emergency stop system according to the embodiment of the present disclosure and is a cross-sectional view of the emergency stop switch. FIG. 12B is a diagram illustrating the first specific example of the doubled push-down detection structure of the operation button in the emergency stop system according to the embodiment of the present disclosure and illustrates a display plate. The doubled push-down detection structure according to the first specific example includes the door 22-1 which is the state output unit 22 and opens and closes in accordance with whether or not the operation button 21 is pushed down as described with reference to FIGS. 7A-7D, the sub-state output unit 25 in which a state changes in accordance with whether or not the operation button 21 is pushed down, and a pipe 22-8 which allows information related to whether or not the operation button 21 is pushed down to be transmitted to the sub-state output unit 25. Further, as illustrated in FIG. 12B, the sub-state output unit 25 includes a display plate 22-7 on which two forms are described. Note that in FIG. 12A, for the sake of convenient illustration, the pipe 22-8 has a linear shape, but since the state output unit 22 and the sub-state output unit 25 are provided to the front surface and the back surface of the mobile device 2, respectively, the pipe 22-8 which connects the state output unit 22 and the sub-state output unit 25 to each other is made of a flexible material that can be bent. The pipe 22-8 is filled with a gas, such as the air, or a liquid, such as an oil, and further, in the state output unit 22, the support frame 21-1 of the operation button 21 and the pipe 22-8 constitute a piston-cylinder structure and in the sub-state output unit 25, the display plate 22-7 and the pipe 22-8 constitute a piston-cylinder structure. Depending on whether or not the operation button 21 is pushed down, the support frame 21-1 of the operation button 21 vertically moves as a piston, and such a vertical motion is transmitted through a gas or an oil in the pipe 22-8 to the display plate 22-7 which similarly functions as a piston. On the display plate 22-7 in the sub-state output unit 25, the forms described at a side of the door 22-1 facing the camera 41-1 and at a side of the support frame 21-1 of the operation button 21 facing the camera 41-1 are correspondingly described. In other words, the forms are described on the door 22-1, the support frame 21-1, and the display plate 22-7 in such a manner that an image as imaged by the camera 41-1 when the operation button 21 is not pushed down is identical with an image as imaged by the camera 41-2 and an image as imaged by the camera 41-1 when the operation button 21 is pushed down is identical with an image as imaged by the camera 41-2. For example, when on the door 22-1 imaged by the camera 41-1 when the operation button 21 is not pushed down, for example, a square is described, on a surface of the display plate 22-7 as positioned at such a time (i.e., when the operation button 21 is not pushed down) which is imaged by the camera 41-2, the square is similarly described. When on the support frame 21-1 imaged by the camera 41-1 when the operation button 21 is pushed down, for example, a circle is described, on the surface of the display plate 22-7 as positioned at such a time (i.e., when the operation button 21 is pushed down) which is imaged by the camera 41-2, the circle is similarly described.

Figure 13A:
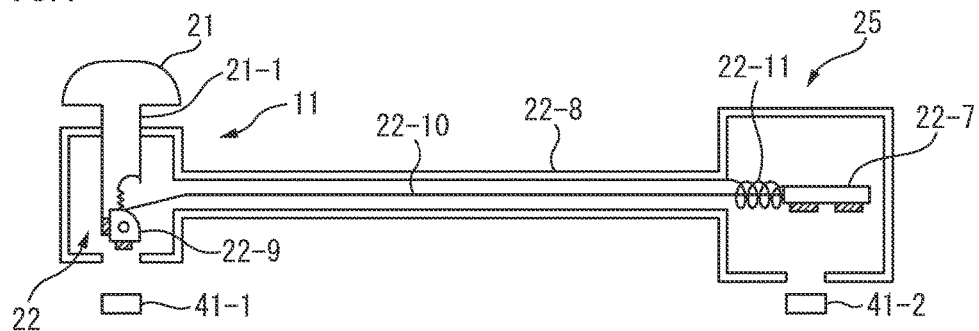
FIG. 13A is a diagram illustrating a second specific example of the doubled push-down detection structure of the operation button in the emergency stop system according to the embodiment of the present disclosure and is a cross-sectional view of the emergency stop switch when the operation button is not pushed down.
Figure 13B:
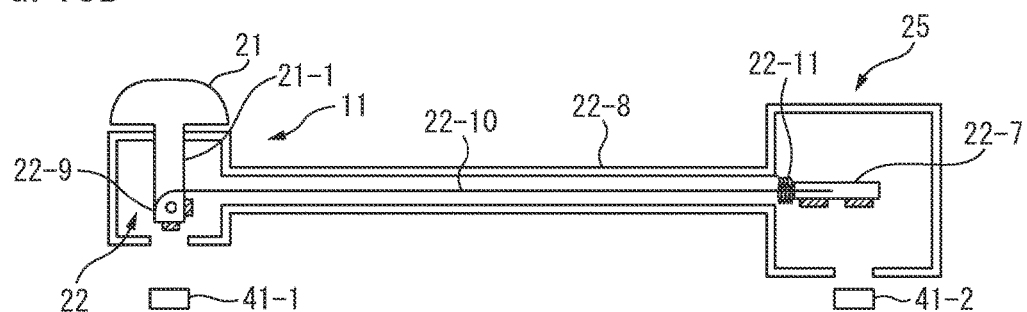
FIG. 13B is a diagram illustrating the second specific example of the doubled push-down detection structure of the operation button in the emergency stop system according to the embodiment of the present disclosure and is a cross-sectional view of the emergency stop switch when the operation button is pushed down.
Figure 13C:
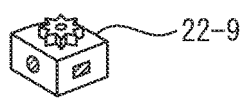
FIG. 13C is a diagram illustrating the second specific example of the doubled push-down detection structure of the operation button in the emergency stop system according to the embodiment of the present disclosure and illustrates a display device.
Figure 13D:
FIG. 13D is a diagram illustrating the second specific example of the doubled push-down detection structure of the operation button in the emergency stop system according to the embodiment of the present disclosure and illustrates the display plate.

FIG. 13A is a diagram illustrating a second specific example of the doubled push-down detection structure of the operation button in the emergency stop system according to the embodiment of the present disclosure and is a cross-sectional view of the emergency stop switch when the operation button is not pushed down. FIG. 13B is a diagram illustrating the second specific example of the doubled push-down detection structure of the operation button in the emergency stop system according to the embodiment of the present disclosure and is a cross-sectional view of the emergency stop switch when the operation button is pushed down. FIG. 13C is a diagram illustrating the second specific example of the doubled push-down detection structure of the operation button in the emergency stop system according to the embodiment of the present disclosure and illustrates a display device. FIG. 13D is a diagram illustrating the second specific example of the doubled push-down detection structure of the operation button in the emergency stop system according to the embodiment of the present disclosure and illustrates the display plate. The doubled push-down detection structure according to the second specific example includes a display device 22-9 on which two forms are described, the sub-state output unit 25 in which a state changes in accordance with whether or not the operation button 21 is pushed down, and the pipe 22-8 which allows information related to whether or not the operation button 21 is pushed down to be transmitted to the sub-state output unit 25. Further, as illustrated in FIGS. 13A, 13B, and 13D, the sub-state output unit 25 includes the display plate 22-7 on which the two forms are described. In the pipe 22-8, a wire 22-10 which connects the display device 22-9 in the state output unit 22 and the display plate 22-7 in the sub-state output unit 25 to each other is disposed. Note that in FIGS. 13A and 13B, for the sake of convenient illustration, the pipe 22-8 and the wire 22-10 have a linear shape, but since the state output unit 22 and the sub-state output unit 25 are provided to the front surface and the back surface of the mobile device 2, respectively, the pipe 22-8 and the wire 22-10 which connect the state output unit 22 and the sub-state output unit 25 to each other are made of a flexible material that can be bent. It is configured that depending on whether or not the operation button 21 is pushed down, the support frame 21-1 of the operation button 21 vertically moves, and depending on such a vertical motion, the display device 22-9 rotates. When the operation button 21 is pushed down, the support frame 21-1 of the operation button 21 moves downward, whereby the display device 22-9 rotates to wind the wire 22-10, and the display plate 22-7 is pulled (FIG. 13B). On the other hand, when the operation button 21 is no longer pushed down, by a repulsive force of a spring 22-11 attached to the display plate 22-7, the display plate 22-7 is pushed back to an original position, whereby the wire 22-10 is pulled back in a direction opposite to that when the operation button 21 is pushed down, and the display device 22-9 rotates in such a manner that the wire 22-10 wound on the display device 22-9 is released (FIG. 13A). Further, in the second specific example, the forms are described on the display plate 22-7 and the display device 22-9 in such a manner that an image as imaged by the camera 41-1 when the operation button 21 is not pushed down is identical with an image as imaged by the camera 41-2 and an image as imaged by the camera 41-1 when the operation button 21 is pushed down is identical with an image as imaged by the camera 41-2. For example, when on a surface of the display device 22-9 imaged by the camera 41-1 when the operation button 21 is not pushed down, for example, a square is described, on the surface of the display plate 22-7 as positioned at such a time (i.e., when the operation button 21 is not pushed down) which is imaged by the camera 41-2, the square is similarly described. When on the surface of the display device 22-9 imaged by the camera 41-1 when the operation button 21 is pushed down, for example, a circle is described, on the surface of the display plate 22-7 as positioned at such a time (i.e., when the operation button 21 is pushed down) which is imaged by the camera 41-2, the circle is similarly described.

Figure 14A:
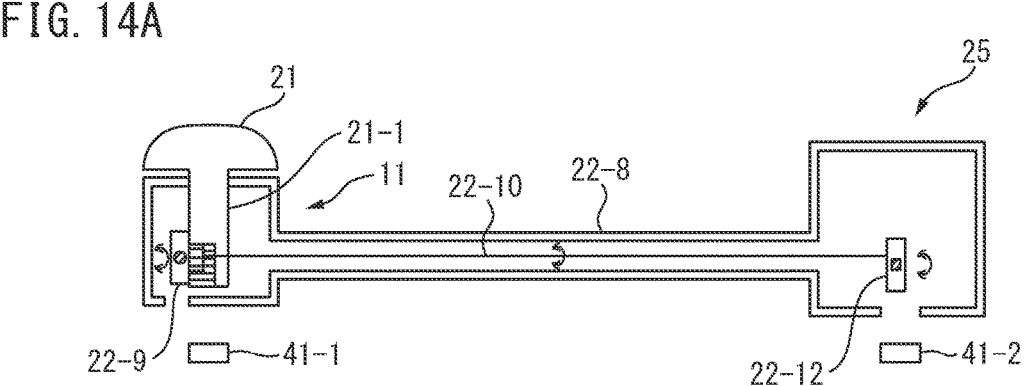
FIG. 14A is a diagram illustrating a third specific example of the doubled push-down detection structure of the operation button in the emergency stop system according to the embodiment of the present disclosure and is a cross-sectional view of the emergency stop switch.
Figure 14B:
FIG. 14B is a diagram illustrating the third specific example of the doubled push-down detection structure of the operation button in the emergency stop system according to the embodiment of the present disclosure and illustrates the display device in the state output unit.
Figure 14C:
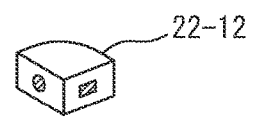
FIG. 14C is a diagram illustrating the third specific example of the doubled push-down detection structure of the operation button in the emergency stop system according to the embodiment of the present disclosure and illustrates the display device in a sub-state output unit.

FIG. 14A is a diagram illustrating a third specific example of the doubled push-down detection structure of the operation button in the emergency stop system according to the embodiment of the present disclosure and is a cross-sectional view of the emergency stop switch. FIG. 14B is a diagram illustrating the third specific example of the doubled push-down detection structure of the operation button in the emergency stop system according to the embodiment of the present disclosure and illustrates the display device in the state output unit. FIG. 14C is a diagram illustrating the third specific example of the doubled push-down detection structure of the operation button in the emergency stop system according to the embodiment of the present disclosure and illustrates the display device in the sub-state output unit. The doubled push-down detection structure according to the third specific example includes the display device 22-9 provided in the state output unit 22 on which two forms are described, the sub-state output unit 25 in which a state of a display device 22-12 changes in accordance with whether or not the operation button 21 is pushed down, and the pipe 22-8 which allows information related to whether or not the operation button 21 is pushed down to be transmitted to the sub-state output unit 25. As illustrated in FIG. 14B, on the display device 22-9 in the state output unit 22, two forms are described, and as illustrated in FIG. 14C, on the display device 22-12 in the sub-state output unit 25, the two forms are described. In the pipe 22-8, the wire 22-10 which connects the display device 22-9 in the state output unit 22 and the display device 22-12 in the sub-state output unit 25 to each other is disposed. Note that in FIG. 14A, for the sake of convenient illustration, the pipe 22-8 and the wire 22-10 have a linear shape, but since the state output unit 22 and the sub-state output unit 25 are provided to the front surface and the back surface of the mobile device 2, respectively, the pipe 22-8 and the wire 22-10 which connect the state output unit 22 and the sub-state output unit 25 to each other are made of a flexible material that can be bent. Depending on whether or not the operation button 21 is pushed down, the support frame 21-1 of the operation button 21 vertically moves, and depending on such a vertical motion, the display device 22-9 rotates and further the wire 22-10 also rotates, then depending thereon, the display device 22-12 in the sub-state output unit 25 also rotates. Further, in the third specific example, the forms are described on the display device 22-9 in the state output unit 22 and the display device 22-12 in the sub-state output unit 25 in such a manner that an image as imaged by the camera 41-1 when the operation button 21 is not pushed down is identical with an image as imaged by the camera 41-2 and an image as imaged by the camera 41-1 when the operation button 21 is pushed down is identical with an image as imaged by the camera 41-2. For example, when on the surface of the display device 22-9 in the state output unit 22 imaged by the camera 41-1 when the operation button 21 is not pushed down, for example, a square is described, on a surface of the display device 22-12 in the sub-state output unit 25 as positioned at such a time (i.e., when the operation button 21 is not pushed down) which is imaged by the camera 41-2, the square is similarly described. When on the surface of the display device 22-9 in the state output unit 22 imaged by the camera 41-1 when the operation button 21 is pushed down, for example, a circle is described, on the surface of the display device 22-12 in the sub-state output unit 25 as positioned at such a time (i.e., when the operation button 21 is pushed down) which is imaged by the camera 41-2, the circle is similarly described.

As described above, according to the first to third specific examples with respect to the doubled push-down detection structure as described with reference to FIGS. 12A-14C, for example, when the operation button 21 is pushed down, even if one of the camera 41-1 and the camera 41-2 does not work and fails to capture an image, an emergency stop signal indicating an emergency stop of the robot 103 can be generated based on a picture as imaged by the other camera, which exhibits more safety. In the description of the first to third specific examples with respect to the doubled push-down detection structure as described with reference to FIGS. 12A-14C, a state outputted by the state output unit 22 is a form related to a square and a circle, which is, however, only illustrative, and as described above, a suitable combination of a color constituted by a combination of hue, brightness, and saturation as described with reference to FIGS. 5A and 5B and a form constituted by a combination of a shape and a figure as described with reference to FIGS. 6A-6D is described on the support frame 21-1, the display plate 22-7, the display device 22-9, and the display device 22-12 as a "state of the state output unit 22 depending on whether or not the operation button 21 is pushed down".

Figure 15A:
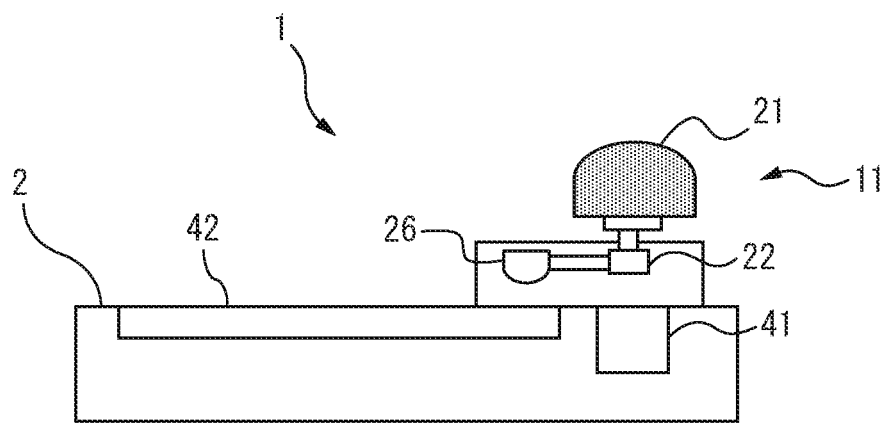
FIG. 15A is a diagram illustrating a fourth specific example of the doubled push-down detection structure of the operation button in the emergency stop system according to the embodiment of the present disclosure and is a cross-sectional view of the emergency stop switch when the operation button is not pushed down.
Figure 15B:
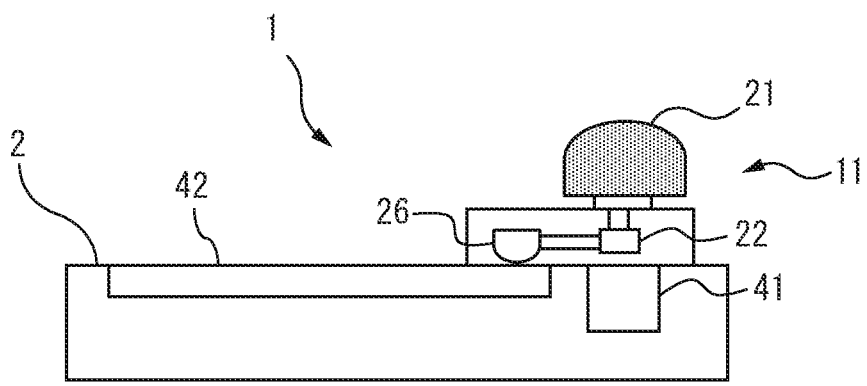
FIG. 15B is a diagram illustrating the fourth specific example of the doubled push-down detection structure of the operation button in the emergency stop system according to the embodiment of the present disclosure and is a cross-sectional view of the emergency stop switch when the operation button is pushed down.

FIG. 15A is a diagram illustrating a fourth specific example of the doubled push-down detection structure of the operation button in the emergency stop system according to the embodiment of the present disclosure and is a cross-sectional view of the emergency stop switch when the operation button is not pushed down. FIG. 15B is a diagram illustrating the fourth specific example of the doubled push-down detection structure of the operation button in the emergency stop system according to the embodiment of the present disclosure and is a cross-sectional view of the emergency stop switch when the operation button is pushed down. The doubled push-down detection structure according to the fourth specific example includes a touch panel input unit 26 which comes into contact with the touch panel 42 of the mobile device 2 when the operation button 21 is pushed down and fails to come into contact with the touch panel 42 of the mobile device 2 when the operation button 21 is not pushed down. In other words, contact and non-contact between the touch panel input unit 26 and the touch panel 42 depends on whether or not the operation button 21 is pushed down. In the storage unit (not illustrated) in the mobile device 2, a software program which executes processing to display a switch icon for outputting an emergency stop signal on the touch panel 42 of the mobile device 2 and processing to generate an emergency stop signal indicating an emergency stop of the robot 103 when the touch panel input unit 26 and the touch panel 42 come into contact with each other is installed, and the arithmetic processing unit (not illustrated) in the mobile device 2 operates in accordance with such software program installed in the storage unit, thereby realizing such a function. According to the fourth specific example, for example, even if one of the camera 41 and the touch panel 42 is out of order and fails to capture an image, an emergency stop signal indicating an emergency stop of the robot 103 can be generated based on a picture as imaged by the camera in order or contact of the touch panel input unit 26 with the touch panel 42 in order, which exhibits more safety.

Figure 16:
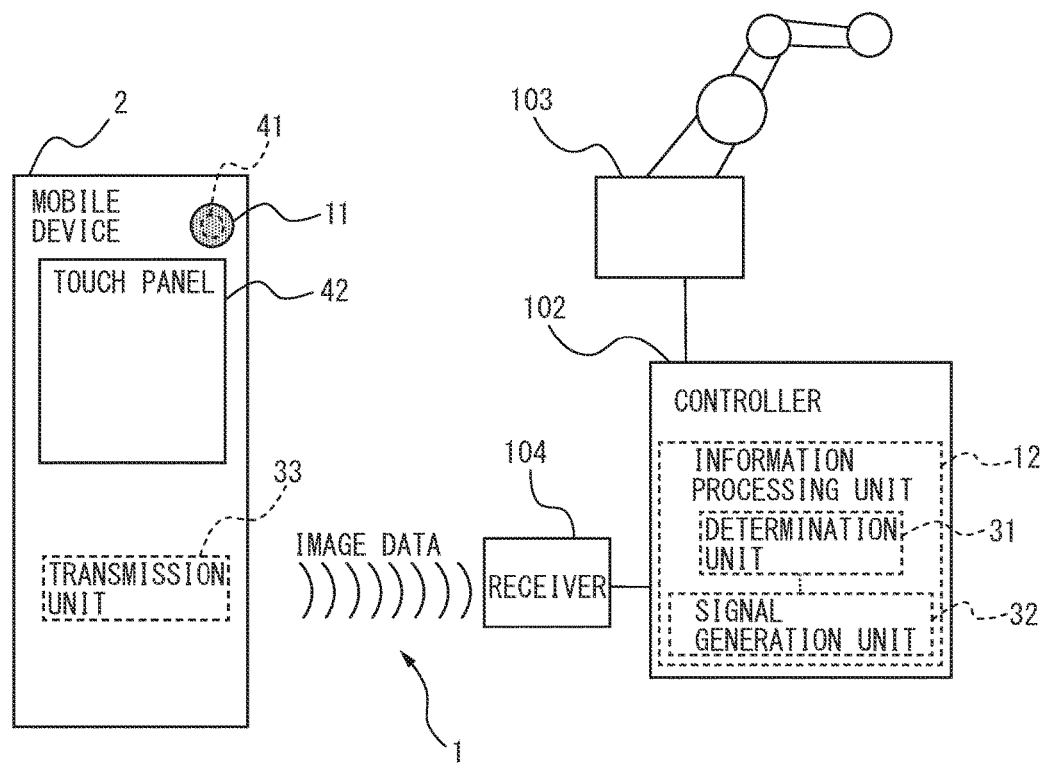
FIG. 16 is a diagram illustrating a case in which an information processing unit is provided in a controller which controls a robot in the emergency stop system according to the embodiment of the present disclosure.
Figure 17:
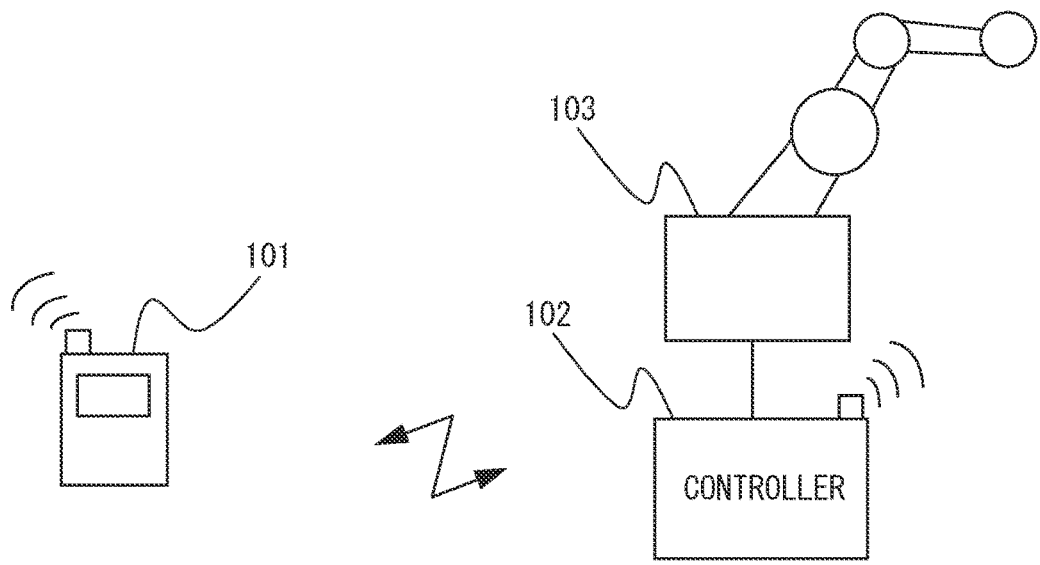
FIG. 17 is a schematic diagram of an ordinary machine system constituted by a controller of a robot and a wireless teaching pendant.

In each embodiment as described above, in the embodiment as illustrated in FIG. 1, the information processing unit 12 is provided in the mobile device 2, but may be provided in the controller 102 which controls the robot 103 as illustrated in FIG. 16. FIG. 16 is a diagram illustrating a case in which the information processing unit is provided in the controller which controls the robot in the emergency stop system according to the embodiment of the present disclosure. The information processing unit 12 including the determination unit 31 and the signal generation unit 32 is provided to a controller 102 which controls the robot 103. Accordingly, an image related to a state of the state output unit 22 as imaged by the camera 41 of the mobile device 2 is transmitted through a transmission unit 33 of the mobile device 2 to the controller 102 which controls the robot 103. The information processing unit 12 provided in the controller 102 determines in accordance with the image related to the state of the state output unit 22 as imaged by the camera 41 of the mobile device 2 whether to output an emergency stop signal indicating an emergency stop of the robot 103 operated by the mobile device 2 or to output an emergency stop signal indicating no emergency stop of the robot 103. The determination unit 31 and the signal generation unit 32 may be configured, e.g., in the form of a software program or may be configured by a combination of each type of electronic circuits and a software program. For example, when such units are configured in the form of a software program, in the storage unit (not illustrated) in the controller 102, such software program is installed, and the arithmetic processing unit (not illustrated) in the controller 102 operates in accordance with such software program installed in the storage unit, thereby realizing a function of the determination unit 31 and the signal generation unit 32. Further, alternatively, the determination unit 31 and the signal generation unit 32 may be realized as a semiconductor integrated circuit in which a software program that realizes a function of such respective units is written, and in such a case, such semiconductor integrated circuit is incorporated in the controller 102 to realize a function of the determination unit 31 and the signal generation unit 32. Note that respective processing in the determination unit 31 and the signal generation unit 32 in the information processing unit 12 is similar to that as already described, and thus description thereof is omitted.

According to one aspect of the present disclosure, the low-cost and convenient emergency stop system which can reliably perform an emergency stop of a robot or a CNC machine tool operated by a mobile device can be realized.

According to one aspect of the present disclosure, an operation button which physically protrudes is provided to an emergency stop switch so that the operator can easily perform a button push-down operation at the time of an emergency and reliably perform an emergency stop of a machine, such as a robot and a CNC machine tool, operated by a mobile device, which exhibits high safety. The operation button provided with a physical "protrusion" can be intuitively operated by the operator without watching the emergency stop switch.

What is claimed is:

1. An emergency stop system which performs an emergency stop of a machine operated by a mobile device, the emergency stop system comprising:
    an emergency stop switch including an operation button having a pushed down position and a non-pushed down position, a state output indicator which outputs a state in accordance with whether or not the operation button is in the pushed down position, wherein the operation button and the state output indicator are attached to the mobile device in a detachable manner such that the state of the state output indicator is positioned at a side facing a camera of the mobile device at the time of attachment to the mobile device; and
    a processor configured to determine, in accordance with an image of the state of the state output indicator received from the camera of the mobile device, whether to output an emergency stop signal indicating an emergency stop action of the machine operated by the mobile device when the operation button is in the pushed down position or to output a signal indicating no emergency stop of the machine when the operation button is in the non-pushed down position.

2. The emergency stop system according to claim 1, wherein the processor is configured to:
    determine whether the image of the state of the state output indicator received from the camera of the mobile device is an image of the operation button in a pushed down position; and
    generate an emergency stop signal indicating an emergency stop of the machine when the determination is that the operation button is the pushed down position, and generate another signal indicating no emergency stop of the machine when the determination is that the operation button is not the pushed down position.

3. The emergency stop system according to claim 1, wherein the processor is provided in the mobile device.

4. The emergency stop system according to claim 3, wherein the emergency stop switch further includes a touch panel, wherein the touch panel of the emergency stop switch comes into contact with a touch panel of the mobile device when the operation button is pushed down and fails to come into contact with the touch panel of the mobile device when the operation button is not pushed down, wherein
    the processor outputs an emergency stop signal indicating an emergency stop of the machine when the touch panel of the emergency stop switch comes into contact with the touch panel of the mobile device.

5. The emergency stop system according to claim 1, wherein the processor is further configured to transmit the image received from the camera of the mobile device to a controller that controls the machine operated by the mobile device, wherein
    the processor is provided in the controller.

6. The emergency stop system according to claim 1, wherein the state of the state output indicator is a color different in at least one of hue, brightness, and saturation depending on whether the operation button is pushed down or whether the operation button is not pushed down.

7. The emergency stop system according to claim 1, wherein the state of the state output indicator is a form different in at least one of a shape and a figure depending on whether the operation button is pushed down or whether the operation button is not pushed down.

8. The emergency stop system according to claim 1, wherein the state output indicator is an illumination element which illuminates toward a side facing the camera of the mobile device, and an illumination state of the illumination element differs depending on whether the operation button is pushed down or whether the operation button is not pushed down.

9. The emergency stop system according to claim 8, wherein the processor outputs an emergency stop signal indicating an emergency stop of the machine when an image related to an illumination state of the illumination element as imaged by the camera of the mobile device indicates that other than each illumination state when the operation button is in the pushed down position and when the operation button is in the non-pushed down position, each illumination state being prescribed in advance.

10. The emergency stop system according to claim 1, wherein the processor outputs an emergency stop signal indicating an emergency stop of the machine when the camera of the mobile device fails to image a state of the state output indicator.

11. The emergency stop system according to claim 1, wherein the state output indicator is attached for each of two cameras provided on a first surface and a second surface of the mobile device, respectively.

* * * * *